April 2, 1963 L. L. FOWLER 3,083,831
FILTER FOR CONTAMINATED LIQUIDS
Filed Jan. 26, 1959 2 Sheets-Sheet 1

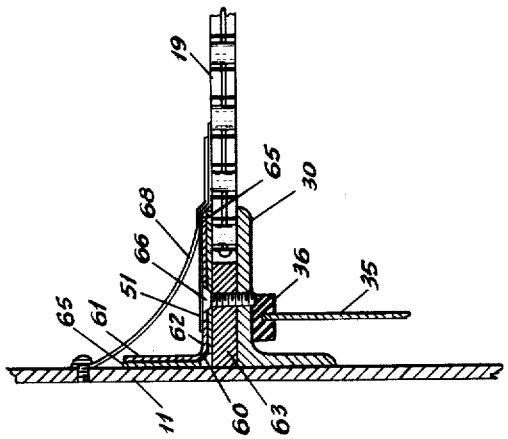
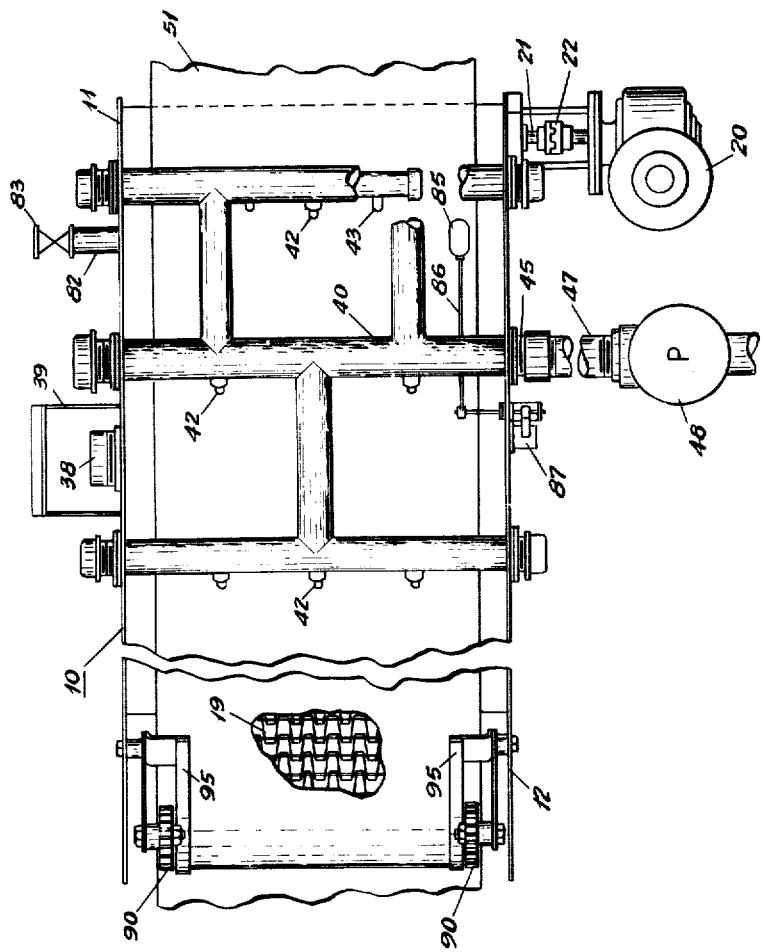

3,083,831
FILTER FOR CONTAMINATED LIQUIDS
Leslie L. Fowler, Tucson, Ariz., assignor to Infilco Incorporated, Tucson, Ariz., a corporation of Delaware
Filed Jan. 26, 1959, Ser. No. 788,894
4 Claims. (Cl. 210—111)

This invention relates to a filter for contaminated liquids and more particularly to a filter utilizing a movable and expendable filter medium.

It is an object of this invention to provide an improved filter of this general type.

Another object is to provide a filter of the type referred to which requires less space for a given volume of liquid to be filtered.

Another object is to provide a filter of the type referred to, which is economical in use of the filter medium.

Another object is to provide a filter which permits a higher flow rate over a given area than has been feasible with other filters of this general type.

Another object is to obtain improved cleaning by the use of tighter or less porous filter media than can be used with other filters of the type referred to.

Another object is to provide a filter wherein the liquid to be filtered is aerated, whereby a better temperature control may be maintained and improved sanitary conditions are obtained when treating liquids used as coolants, such as oil-water emulsions, which are subject to bacterial action accelerating rancidity.

Another object is to provide a filter wherein the filtered out solids are prevented from quiescently depositing on the filter medium and rapidly clogging it.

These and other objects will become apparent upon consideration of the detailed description and the claims which follow.

Filters using a moving and expendable filter medium are well known in the art. In filters of this type heretofore known, the liquid to be filtered is allowed to filter through the filter medium by gravity, and the filtered out solids are allowed to deopsit on the filter medium. The rate of filtration in these gravity filters is necessarily limited, and, to maintain a reasonable rate of filtration, a certain porosity of the medium is required which may be too great to prevent the escape of very fine solids.

The filter medium may be fed continuously from a supply roll through the filtering area and toward a disposal outlet so that the deposited solids are removed continuously from the filtering area and a fresh filter medium is always available, or it may be moved intermittently, as required by its clogging.

In intermittent operation, automatic means are usually provided which respond to a drop in the rate of flow through the filter or a rise in the level of liquid on the filter medium, to initiate the feeding of fresh filter medium to the filter and removal of the clogged medium.

Continuous feeding of fresh expendable filter material obviously is wasteful. Intermittent feeding, as practiced in present day filters, leads to relatively frequent drops in the rate of flow due to the rapidly increasing build up of filtered-out solids on the filter medium, whereby the over-all efficiency of the filter is lowered. Some materials, particularly gummy and rubbery solids, clog the filter medium so quickly that intermittent filtration becomes practically impossible with present day filtration methods.

These disadvantages have been overcome by my invention.

In my new filter the liquid to be filtered is sprayed under controlled pressure against the filter medium. Some of the sprayed liquid passes immediately through the medium as it impinges against it or is forced through the medium by the liquid-to-liquid impact of further sprays or liquid to be filtered. The balance is recirculated to the spray nozzles at a controlled rate. This impingement filtration results in much higher flow rates over a given area than gravity filtration, and also permits using less porous media whereby even very fine solids can be filtered out.

The sprays of liquid to be filtered are directed against the filter medium at such an angle that they wash away the filtered-out solids as they deposit and move them out of the filtering area toward the material outlet, while the filter medium remains stationary. This continuous washing action of the sprays of liquid to be filtered keeps the interstices of the filter medium open for much longer periods than is possible in gravity filtration where the solids are allowed to deposit on and penetrate into the interstices of the medium.

When the filter medium eventually becomes clogged, it is removed automatically and replaced by fresh medium, and the solids which have accumulated outside the filtering area are carried along to a point of disposal with the spent medium.

My invention will be more readily understood by references to the drawings which form a part hereof and wherein like reference characters in the several figures designate similar elements.

FIGURE 2 is a partial plan view of the filter shown in FIGURE 1 with its cover removed and the filter medium partly broken away; and FIGURE 3 is a cross-sectional view, on an enlarged scale, taken along line 3—3 of FIGURE 1.

Figure 1:
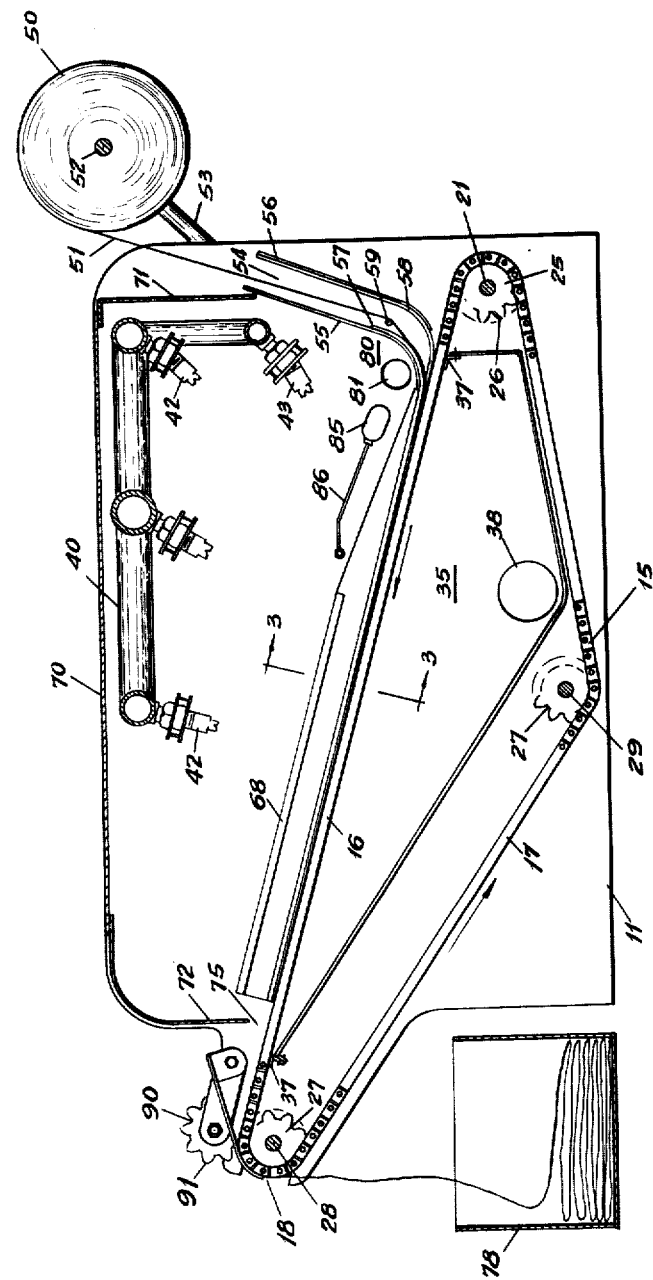
FIGURE 1 is a vertical cross-sectional view of a filter according to the invention.

Referring to the drawings, a filter according to the invention may be mounted on a supporting frame 10 comprising side members 11 and 12 of suitable material, such as shaped steel plates, held in suitable spaced relationship by spacers, not shown.

An inclined, endless belt conveyor 15 having an upper flight 16 and a return flight 17 may be rotatably mounted in the frame 10 with the material discharge end of 18 of the upper flight 16 substantially higher than its other end and with the return flight 17 spaced from the upper flight 16, as shown. While many different types of belt conveyors may be used in the filter, I prefer to use a wire-mesh conveyor belt 19 of the type shown in FIGURE 2.

The conveyor 15 is driven by a gear-head motor 20 which is connected to a drive shaft 21 by means of a coupling 22. A drive gear 25 is affixed to the drive shaft 21 and has teeth 26 which engage in the wire-mesh of the conveyor belt 19 to transmit even torque at all points of contact and insure even, properly aligned movement of the conveyor belt 19. The conveyor belt 19 is trained about toothed idlers 27 affixed to idler shafts 28 and 29. The drive shaft 21 and idler shaft 29 are journaled in the side plates 11 and 12 by means of self aligning bearings, not shown. The idler shaft 28 may be journaled in adjustable bearings, not shown, supported by the side plates 11 and 12, which permit control of slack of the conveyor belt 19 due to wear and stretching. The edges of the conveyor belt 19 are supported by a conveyor track 30, which is affixed to the side plates 11 and 12 of the frame 10.

A filtered-liquid collection pan 35 is mounted between the upper flight 16 and return flight 17 of the belt conveyor 15. The sides of the pan 35 may be sealed to the conveyor track 30 by means of gaskets 36, as shown for one side in FIGURE 3. Sealing strips 37 of suitable material, such as neoprene, formed into fingers or brush segments and engaging the wire mesh of the conveyor belt 19, may be attached to opposite ends of the pan 35, as shown in FIGURE 1, to prevent clean filtered liquid from running down the conveyor 15 beyond the lower end of the pan 35 and from being carried past the upper end of the pan. A filtered liquid outlet 38 leads from the pan 35 and may discharge into a collection chamber 39, as shown in FIGURE 2, or may be connected directly to a point of use.

A liquid distributing manifold assembly 40 is supported by the side plates 11 and 12 substantially above the conveyor 15. The manifold 40 has a plurality of ports to which spray nozzles 42 and 43 are affixed.

The nozzles 42 and 43 are selected for the specific type of liquid to be filtered. Depending on the viscosity of the liquid and the type of application, the nozzles may be made of ferrous or non-ferrous metals, plastic or wood. The spray pattern is also selected according to the specific material to be filtered and may be a solid cone or a hollow cone spray. The nozzles may be fixed, and in some cases orifices in the manifold can be used. Preferably, however, the nozzles 42 and 43 have ball and socket joints to permit adjusting them to different positions relative to the conveyor belt 19 as shown in FIGURE 1.

The manifold 40 has an inlet 45 which is connected by a line 47 to a source of the contaminated liquid, such as a collection tank, or machine sump, not shown. A pump 48 is installed on the line 47 to convey the contaminated liquid under predetermined pressure to the manifold.

A supply roll 50 of disposable filter medium 51, preferably in sheet form, is rotatably mounted on a shaft 52, which may be supported from the frame 10, as by brackets 53. Depending on the desired porosity, cloth, woven or non-woven fibers, paper of adequate wet strength, plastic materials woven into sheet form, and the like, may be used for the filter medium 51. The filter medium 51 is fed from the supply roll 50 into the filter and onto the belt conveyor through an envelope 54 formed by walls 55 and 56, and by resilient curtains 57 and 58, affixed, respectively, to the curved lower end of wall 55 and wall 56. To keep the filter medium 51 from dragging on the wall 55, it is trained about a roller 59 which is supported by the frame 10. The envelope 54 forms a liquid tight seal across the lower end of the filter assembly and permits the filter medium to move as needed without the danger of unfiltered liquid leaking around and by-passing the filter medium. The conveyor belt 19 forms a flat, upwardly inclined support for the sheet of filter medium.

As best seen in FIGURE 3, the edges of the filter medium 51 extend beyond the edges of the belt 19 onto sealing members 60 which extend along the sides of the filter. Each sealing member may comprise a shaped stainless steel angle having its vertical leg 61 rigidly affixed to one of the side plates 11 and 12 and its horizontal leg 62 supported by a spacer 63 which, in turn, is supported by the conveyor track 30. A resilient seal 65 is placed between the vertical leg 61 and the side plate 11 and between the horizontal leg 62 and the spacer 63, respectively. The horizontal leg 62, seal 65, spacer 63 and track 30 are clamped together by screws 66 which have their heads countersunk into the horizontal leg 62 to assure that the edges of the filter medium 51 ride on a smooth surface.

To each of the side plates 11 and 12 a shield 68 of any suitable material, such as rubber or plastic, is attached and is draped over the respective edges of the filter medium 51 to prevent liquid from flowing under the edges of the medium and lifting the edges and disrupting their sealing contact with the sealing member 60.

Referring again to FIGURE 1, the filter assembly is covered by a lid 70, which is supported from the frame 10, and extends above the manifold 40. One end portion 71 of the lid is in sealing contact with the wall 55, while the opposite end portion 72 terminates above the conveyor belt 19 to leave a gap 75 through which air can enter the space beneath the lid.

A receptacle 78 is provided subjacent the material discharge end 18 of the conveyor 15 and receives filter medium dropping off the discharge end with the solids separated from the liquid adhering thereto.

The curved lower end of wall 55 forms a sump 80 having an outlet 81 from which a recirculation line 82 (FIGURE 2) leads. The line 82 may be connected to the line 47 leading to the contaminated liquid inlet 45, by piping, not shown. A valve 83 on the recirculation line 82 permits controlling the quantity of liquid to be withdrawn through the outlet 81 and recirculated to the filter inlet.

A float 85 may be mounted so as to rise and fall with the liquid in the sump 80. An arm 86 is affixed with one end to the float 85 and with its other end to a limit switch 87 which is electrically connected to the gear head motor 20, by means not shown, so as to activate the gear head motor 20 when the float 85 rises to a predetermined elevation.

To assure that the filter medium 51 will always move in unison with the belt 19, sprockets 90 having teeth 91 may be mounted on the side plates 11 and 12 superjacent the edges of the filter medium 51 near the material outlet end 18 of the filter. The teeth 91 of the sprockets 90 penetrate through the filter medium 51 and engage the openings in the wire-mesh belt 19, holding the edges of the filter medium to the belt. A wiper blade 95 may be attached to each side plate 11 and 12 adjacent each sprocket 90 so as to scrape away any material adhering to the teeth 91.

In operation, contaminated liquid to be filtered is pumped to the manifold 40 under controlled pressure and is sprayed in a suitable pattern and at appropriate angles from the nozzles 42 and 43 onto the filter medium 51. A portion of the sprayed liquid passes immediately through the medium as it impinges against it and further liquid is forced through the medium 51 by the liquid-to-liquid impact of further sprays of liquid to be filtered. The balance collects in the sump 80 and is recirculated to the inlet 45 as described in detail below. The liquid to be filtered is aerated as it is sprayed through the rather large volume of air under the lid 70.

The sprays of contaminated liquid issuing from the nozzles 42 are directed against the filter medium 51 at such angles that they wash away the filtered-out solids as they deposit on the filter medium and move them out of the filtering area toward the material outlet 18, while the filter medium 51 remains stationary. By spraying the liquid to be filtered in this manner the solids are prevented from building up on, and clogging, the filter medium 51 as rapidly as is usual in gravity filtration utilizing expendable filter media. Thus the conveyor 15 may remain stationary and the filter medium be used for prolonged periods of time.

The nozzles 43 are preferably adjusted so that their sprays shear the sprays from the nozzles 42 and impinge on the filter medium at an angle so as to form a barrier for the solids beyond which they cannot slide down. These sprays are particularly useful when specially heavy or gummy contaminant loads are encountered.

When the filter medium 51 eventually becomes clogged, the clogged material automatically is removed and fresh material introduced into the filtering zone. Any suitable means may be used therefor. Thus, a timer, not shown, can be used to actuate the motor 20 at regular intervals, coinciding with the periods it takes for the filter medium to become clogged to a predetermined degree. Preferably, however, the float control shown in FIGURE 1 is used. With the filter medium clogged to the predetermined degree, liquid to be filtered will rise in the sump 80 until the float 85 trips the limit switch 87. This actuates the motor 20 to move the conveyor 15 in the direction of the arrows in FIGURE 1. The filter medium moves with the belt 19, the sprockets 90 preventing the filter medium 51 from lagging behind the belt. As the filter medium moves toward the discharge end 18, fresh filter medium 51 is pulled off the roll 50 and enters the filter through the envelope 54. Filter medium 51 reaching the discharge end 18 drops off the conveyor 15, carrying the solids separated from the liquid along, and may be collected in the receptacle 78 for disposal. In this manner the clogged filter medium 51 is removed from, and fresh clean filter medium 51 is introduced into, the filtering area, whereupon the liquid level in the sump 80, which had risen due to clogging of the filter medium 51, will drop to an elevation where the float 85 shuts off the motor 20 and thus terminates movement of the conveyor 15.

Obviously the motor 20 should be started when the filter medium is clogged to a predetermined degree and should be stopped when the clogged filter medium has been removed from the filtering area and before any of the fresh filtering medium passes out of the filtering area.

If the rise and fall of the liquid level in the sump 80 were entirely depending on passage of the liquid through the filter medium, the float 85 might reach the position where it trips the switch 87 to start the motor 20 before the predetermined degree of clogging of the filter medium has been reached, and might reach the position where it re-sets the switch 87 to stop the motor only after some fresh filter medium has moved out of the filtering area. By providing valve 83 on the sump discharge line 82 which can be positioned to permit withdrawal of a suitable portion of the liquid collecting in the sump 80 for recirculation to the manifold 40, the rise and fall of the liquid level in the sump can be accurately controlled so that the float 85 reaches its motor actuating and stopping positions at the proper times. Since different liquids carry solids differing in quantity and quality, each particular installation can thus be readily adjusted to its specific set of circumstances without structural changes.

It will be seen that the new filter is simple in construction and automatic in operation, and is readily adaptable to varying conditions and materials to be filtered. It permits a high filtration rate and is capable of filtering out even very fine solids. When treating materials subject to bacterial action conducive to rancidity of the liquid, the aeration of the contaminated liquid obtained by spraying the liquid through the body of air under the lid of the filter is of particular value.

I claim:

1. In a filter for contaminated liquids of the type utilizing a movable and expendable sheet of filter medium, a rotatably mounted conveyor having an inclined upper flight, inlet means for introducing filter medium from a supply of such filter medium into said filter and onto said upper flight of said conveyor at the lower end portion thereof, said inlet means including a liquid tight seal across said lower end portion permitting the filter medium to move with said conveyor while preventing leakage of unfiltered liquid, and motor means in driving connection with said conveyor, means for filtering the liquid to be filtered through said filter medium, comprising a plurality of spray nozzles mounted in said filter to discharge the liquid to be filtered against the top surface of said sheet of filter medium at different angles, and means for discharging liquid to be filtered from said nozzles and impinging it against said top surface at a predetermined pressure to force at least part of said liquid through said filter medium, a material discharge outlet at the upper end portion of said upper flight, means actuating said motor means to drive said conveyor when the level of the unfiltered liquid at said lower end portion of said filter reaches a predetermined upper elevation and stopping said motor means when said liquid level reaches a predetermined lower elevation, means for withdrawing a predetermined quantity of unfiltered liquid from said lower end portion and returning it to said spray nozzles, and means for collecting filtered liquid and withdrawing it to a point of use, said upper flight presenting a supporting surface for said filter medium which is flat from its lower to its upper end.

2. In a filter for contaminated liquids of the type utilizing a movable sheet of filter medium, an endless conveyor having an upper flight supporting said sheet of filter medium, said conveyor and sheet providing a filtering zone having a fresh filter medium inlet at one end and a spent filter medium discharge at the other end, means for moving said conveyor jointly with said filter medium in the direction toward said spent filter medium discharge, and a filtered liquid collecting pan underneath said filtering zone, means for spraying the liquid to be filtered under pressure against the top surface of said filter medium, said top surface being flat and upwardly inclined over its entire length from said fresh filter medium inlet to said spent filter medium discharge, and said means for spraying the liquid to be filtered being arranged at different angles so that some of the liquid sprays shear others of the sprays, whereby a hydraulic barrier is effected beyond which solids cannot slide down on the filter medium toward said fresh filter medium inlet.

3. In a filter for contaminated liquids of the type utilizing a movable sheet of filter medium, an endless inclined conveyor having an upper flight supporting said sheet of filter medium, said upper flight and sheet of filter medium providing a filtering zone having a fresh filter medium inlet at its lower end and a spent filter medium discharge at its upper end, means for moving said conveyor jointly with said filter medium in the direction toward said spent filter medium discharge, and a filtered liquid collecting pan underneath said filtering zone, means for filtering the liquid to be filtered through said filter medium by spraying it under pressure toward and impinging it against the top surface of said filter medium, said means being arranged so that the sprayed liquid to be filtered impinges on said filter medium at an angle to wash solids depositing thereon by previously filtered liquid toward said spent filter medium discharge and maintain said top surface clean for filtration of the sprayed liquid, said top surface being flat over its entire length from said fresh filter medium inlet to said spent filter medium discharge, and means for withdrawing a predetermined quantity of unfiltered liquid from said lower end of said filtering zone and returning it to said means for filtering the liquid to be filtered.

4. A filter of the type utilizing a rotatably supported endless conveyor having an upper flight and a lower flight, a sheet of filter medium supported by and movable with the upper flight of said conveyor, said upper flight and sheet of filtering medium providing a filtering zone having a fresh filter medium inlet at one end and a spent filter medium discharge at the other end, means for moving said conveyor in the direction toward said filter medium discharge, and means for starting movement of said conveyor when said sheet of filter medium is clogged to a predetermined degree and for stopping its movement when the clogged filter medium has been removed from said filtering zone, characterized by said upper flight presenting for said sheet of filter medium a supporting surface which is continuously flat and upwardly inclined from said filter medium inlet to said filter medium discharge, and by means for filtering the liquid to be filtered through said filter medium by spraying it under a predetermined pressure and from an elevation spaced above said filter medium toward, and impinging it against the top surface of said filter medium at an angle to wash filtered out solids depositing on said filter medium upwardly toward said filter medium discharge, and a filtered liquid collecting pan underneath said upper flight.

References Cited in the file of this patent

UNITED STATES PATENTS

| | | |
|---|---|---|
| 949,724 | Bebbington | Feb. 15, 1910 |
| 1,955,199 | Menge | Apr. 17, 1934 |
| 2,094,350 | Cartigny | Sept. 28, 1937 |
| 2,271,385 | Best | Jan. 27, 1942 |
| 2,658,623 | Thornhill | Nov. 10, 1953 |
| 2,665,812 | Crane | Jan. 12, 1954 |
| 2,720,973 | Gross | Oct. 18, 1955 |
| 2,720,974 | Fowler | Oct. 18, 1955 |

FOREIGN PATENTS

| | | |
|---|---|---|
| 525,623 | Belgium | June 8, 1956 |

UNITED STATES PATENT OFFICE
CERTIFICATE OF CORRECTION

Patent No. 3,083,831                      April 2, 1963

Leslie L. Fowler

It is hereby certified that error appears in the above numbered patent requiring correction and that the said Letters Patent should read as corrected below.

Column 1, line 40, for "deopsit" read -- deposit --; column 2, line 8, for "or" read -- of --; line 48, strike out "of", first occurrence.

Signed and sealed this 12th day of November 1963.

(SEAL)
Attest:
ERNEST W. SWIDER
Attesting Officer

EDWIN L. REYNOLDS
Acting Commissioner of Patents